(12) United States Patent
Tsai et al.

(10) Patent No.: US 10,946,949 B2
(45) Date of Patent: Mar. 16, 2021

(54) APPARATUS AND METHOD FOR FLAP SUPPORT FUSING

(71) Applicant: The Boeing Company, Chicago, IL (US)

(72) Inventors: Kevin R. Tsai, Seattle, WA (US); Mark D. Gerber, Seattle, WA (US)

(73) Assignee: The Boeing Company, Chicago, IL (US)

( * ) Notice: Subject to any disclaimer, the term of this patent is extended or adjusted under 35 U.S.C. 154(b) by 341 days.

(21) Appl. No.: 16/157,883

(22) Filed: Oct. 11, 2018

(65) Prior Publication Data

US 2020/0115033 A1  Apr. 16, 2020

(51) Int. Cl.
*B64C 9/02* (2006.01)
*F16C 11/06* (2006.01)
*B64C 9/20* (2006.01)

(52) U.S. Cl.
CPC ............. *B64C 9/02* (2013.01); *B64C 9/20* (2013.01); *F16C 11/06* (2013.01); *F16C 2326/43* (2013.01)

(58) Field of Classification Search
CPC .... B64C 9/02; B64C 9/16; B64C 9/18; B64C 9/20
See application file for complete search history.

(56) References Cited

U.S. PATENT DOCUMENTS

| | | | | |
|---|---|---|---|---|
| 9,227,722 | B2* | 1/2016 | Soenarjo | B64C 9/16 |
| 2009/0127403 | A1* | 5/2009 | Perez-Sanchez | B64C 9/16 |
| | | | | 244/213 |
| 2012/0119036 | A1* | 5/2012 | Heintjes | B64C 9/16 |
| | | | | 244/198 |

\* cited by examiner

*Primary Examiner* — Richard G Davis
(74) *Attorney, Agent, or Firm* — Felix L. Fischer

(57) ABSTRACT

An under-wing flap support mounting structure incorporates a clevis on a forward end of an underwing beam. A spherical bearing support assembly carrying a spherical bearing is mounted to a fixed wing structure proximate a lower wing skin. A joint coupling has a lug pivotally coupled to the clevis and a longitudinal pin extending from the lug. The longitudinal pin is slidably received in the spherical bearing. The lug has a bore in which a fuse pin is disposed to secure the lug to the clevis and inhibit the lug from pivoting relative to the clevis. A force applied to an aft portion of the underwing beam that is sufficient to urge separation from the wing causes the clevis to apply a shear force to shear the fuse pin and enable the lug to pivot and cause the longitudinal pin to slide out of the spherical bearing. The underwing flap support separates from the wing without resulting damage to the underside of the wing structure.

18 Claims, 19 Drawing Sheets

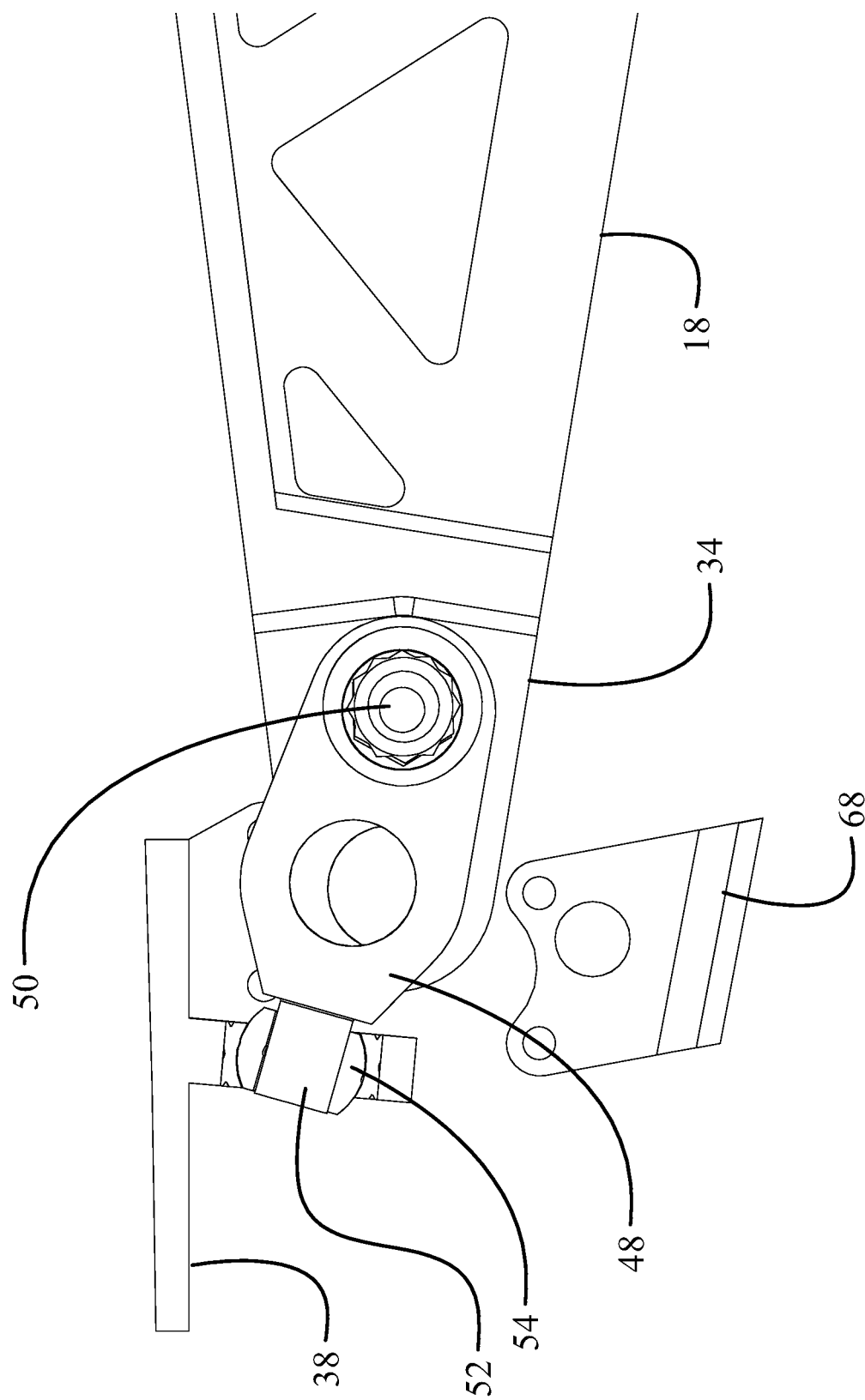



APPARATUS AND METHOD FOR FLAP SUPPORT FUSING

BACKGROUND INFORMATION

Field

Implementations of the disclosure relate generally to structural systems for aircraft and, more particularly, an underwing flap support structure with fusing elements to allow separation of the structure from the wing upon ground contact of the flap or structure.

Background

Commercial aircraft typically employ wing flaps that are downwardly extendible from the wings. The flaps and supporting structure may contact the ground during certain operational scenarios such as a wheels up landing. The wing flap structure typically is connected directly to or in proximity structural elements of the wing and minimizing any damage to the main wing structure resulting from ground contact by the flaps is desirable.

SUMMARY

Implementations disclosed herein provide an under-wing flap support mounting structure incorporating a clevis on a forward end of an underwing beam. A spherical bearing support assembly carrying a spherical bearing is mounted to a fixed wing structure proximate a lower wing skin. A joint coupling has a lug pivotally coupled to the clevis and a longitudinal pin extending from the lug. The longitudinal pin is slidably received in the spherical bearing. The lug has a bore in which a fuse pin is disposed to secure the lug to the clevis and inhibit the lug from pivoting relative to the clevis. A force applied to an aft portion of the underwing beam that is sufficient to urge separation from the wing causes the clevis to apply a shear force to shear the fuse pin and enable the lug to pivot and cause the longitudinal pin to slide out of the spherical bearing. The underwing beam separates from the wing without resulting damage to the underside of the wing structure.

The implementations disclosed provide a method for separating an underwing flap support structure upon impact. A longitudinal pin extending from a lug is supported in a spherical bearing. The lug is rotatably engaged in a clevis on a forward end of an underwing beam (UWB). A force applied to an aft portion of the UWB that is sufficient to urge separation from the wing results in applying a shear force with the clevis to shear a fuse pin engaging the clevis and the lug. The lug rotates and the spherical bearing rotates maintaining alignment of the longitudinal pin extending from the lug. The longitudinal pin slides out of the spherical bearing and releases a forward end of the UWB for continued rotation.

BRIEF DESCRIPTION OF THE DRAWINGS

The features, functions, and advantages of the anti-personnel autonomous vehicle can be achieved independently in various implementations of the present disclosure or may be combined in yet other implementations further details of which can be seen with reference to the following description and drawings.

FIGS. 7A-7G are detailed representations of the fusing elements during the fusing sequence;

DETAILED DESCRIPTION

Implementations disclosed herein provide an under-wing flap support mount, with a joint having a separable pin disposed in a spherical bearing, and a lug end coupled to the under-wing flap support. Any force to an aft portion of the flap support (e.g. wheels up landing) that may separate the under-wing flap support will cause a sacrificial 'fuse' pin to shear, permitting the joint pin to separate from the spherical bearing.

Figure 1A:
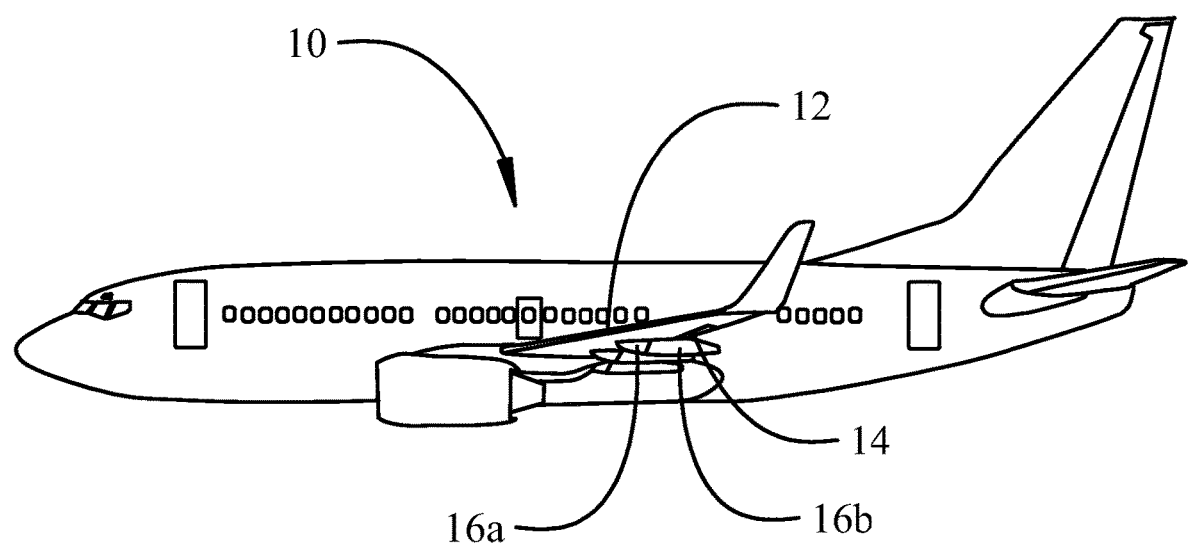
FIG. 1A is a representation of an aircraft in which the implementations disclosed herein may be employed.
Figure 1B:
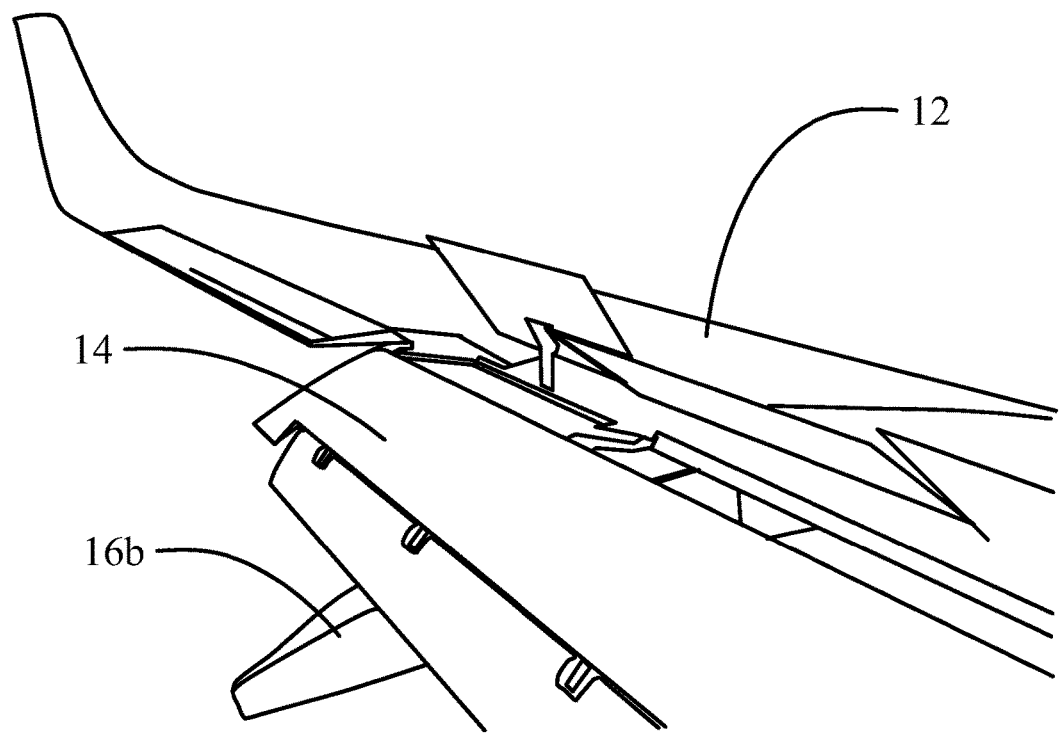
FIG. 1B is a detailed representation of the wing and flap of the aircraft of FIG. 1A.
Figure 2:
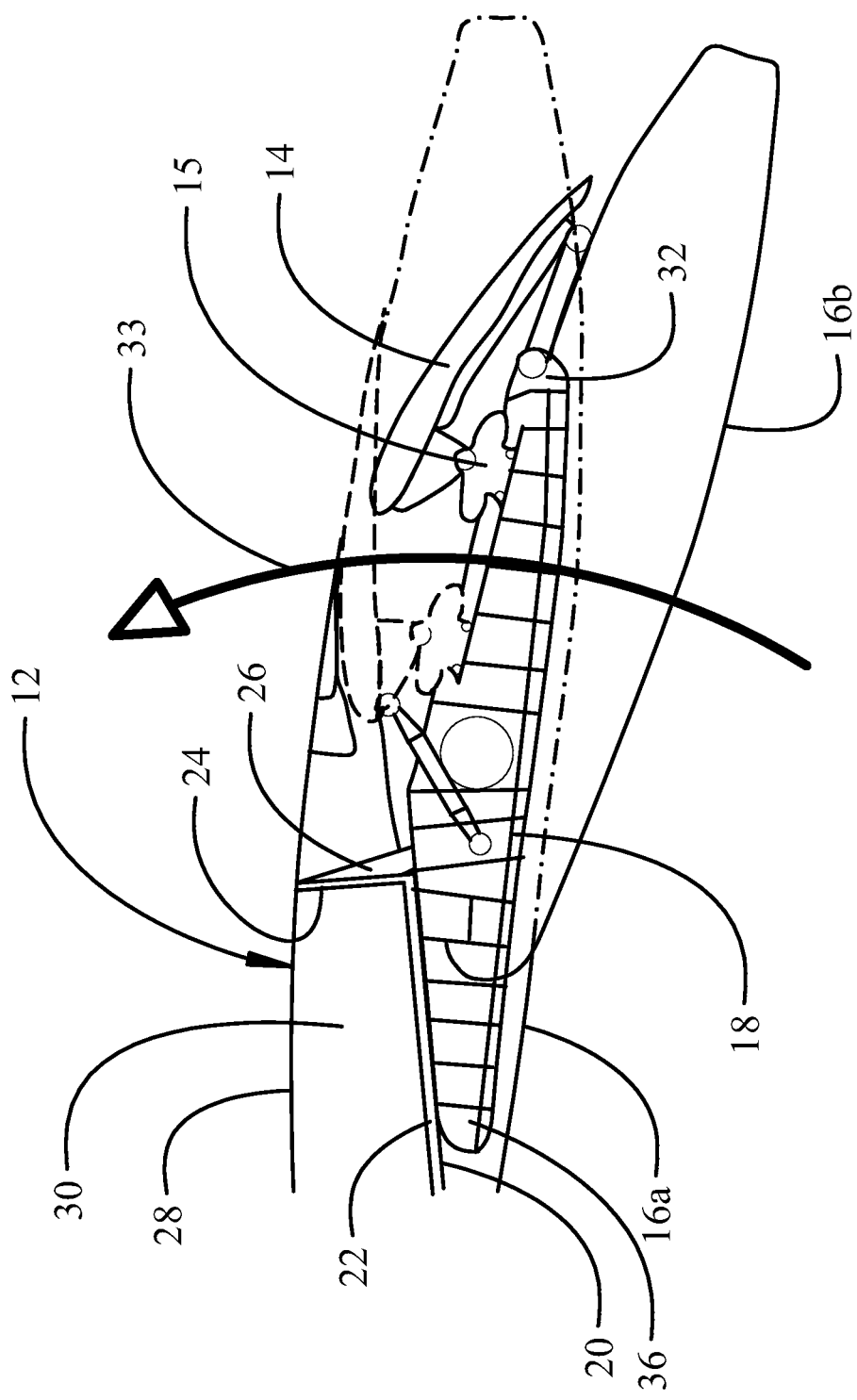
FIG. 2 is a partial section representation of the internal structure of an underwing beam (UWB) support for flaps and movable fairings in the aircraft.

Referring to the drawings, FIGS. 1A and 1B depict an aircraft 10 having a wing 12 with operating flaps 14. The flaps 14 are engaged to the wing 12 at multiple attachment points with underwing structures partially housed within fixed fairings 16*a* and movable fairings 16*b*. Extension of the flaps 14 to enhance aerodynamic performance during takeoff and landing causes the flaps 14 and movable fairings 16*b* to rotate downward relative to the wing 12. As seen in FIG. 2, at each attachment point an underwing beam (UWB) 18 constitutes a principal element in an under-wing flap support mounting structure to attach the flaps 14 and associated operating support links 15 and actuators to the wing 12. The UWB 18 is attached to the wing 12 on a lower surface 20 formed by a wing lower skin 22 and partially housed within the fixed fairing 16*a*. A rear spar 24 extends upward within the wing 12 from the wing lower skin 22 and the UWB 18 is attached to the rear spar with attachment brackets 26. The wing lower skin 22, rear spar 24 and upper wing skin 28 form an integral fuel cell 30 within the wing. In the extended position of the flaps 14 as shown in FIG. 2 (the unextended position shown in phantom) the support links 15 are supported proximate an aft portion 32 of the UWB. During a wheels up landing, the flap 14, movable fairing 16*b*, and, potentially, the aft portion 32 of the UWB 18, contact the ground asserting a force causing a rotational moment 33 to be exerted on the UWB 18.

Figure 3A:
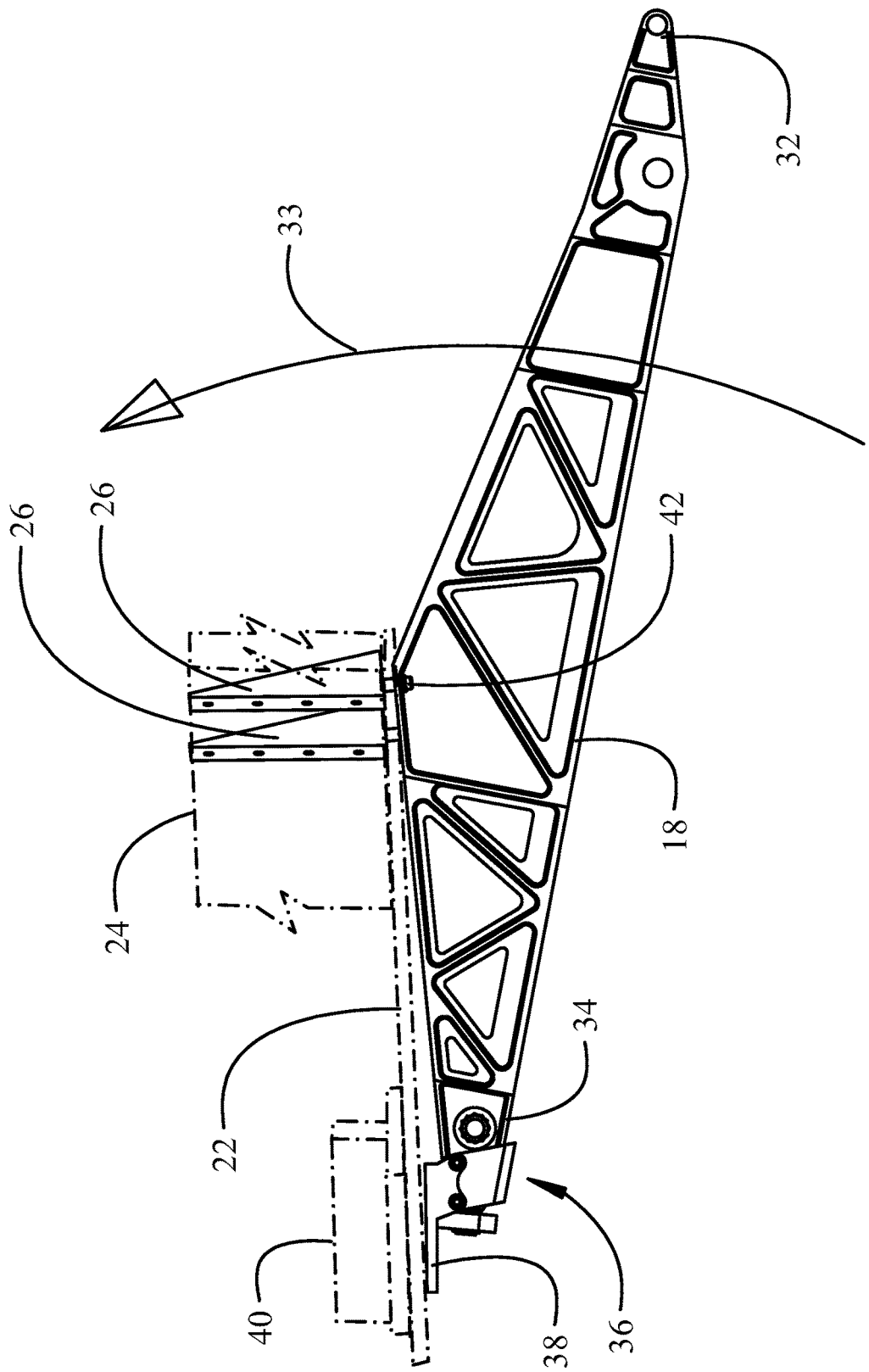
FIG. 3A is a detailed side view of the UWB and associated structure for an exemplary implementation as disclosed herein.
Figure 3B:
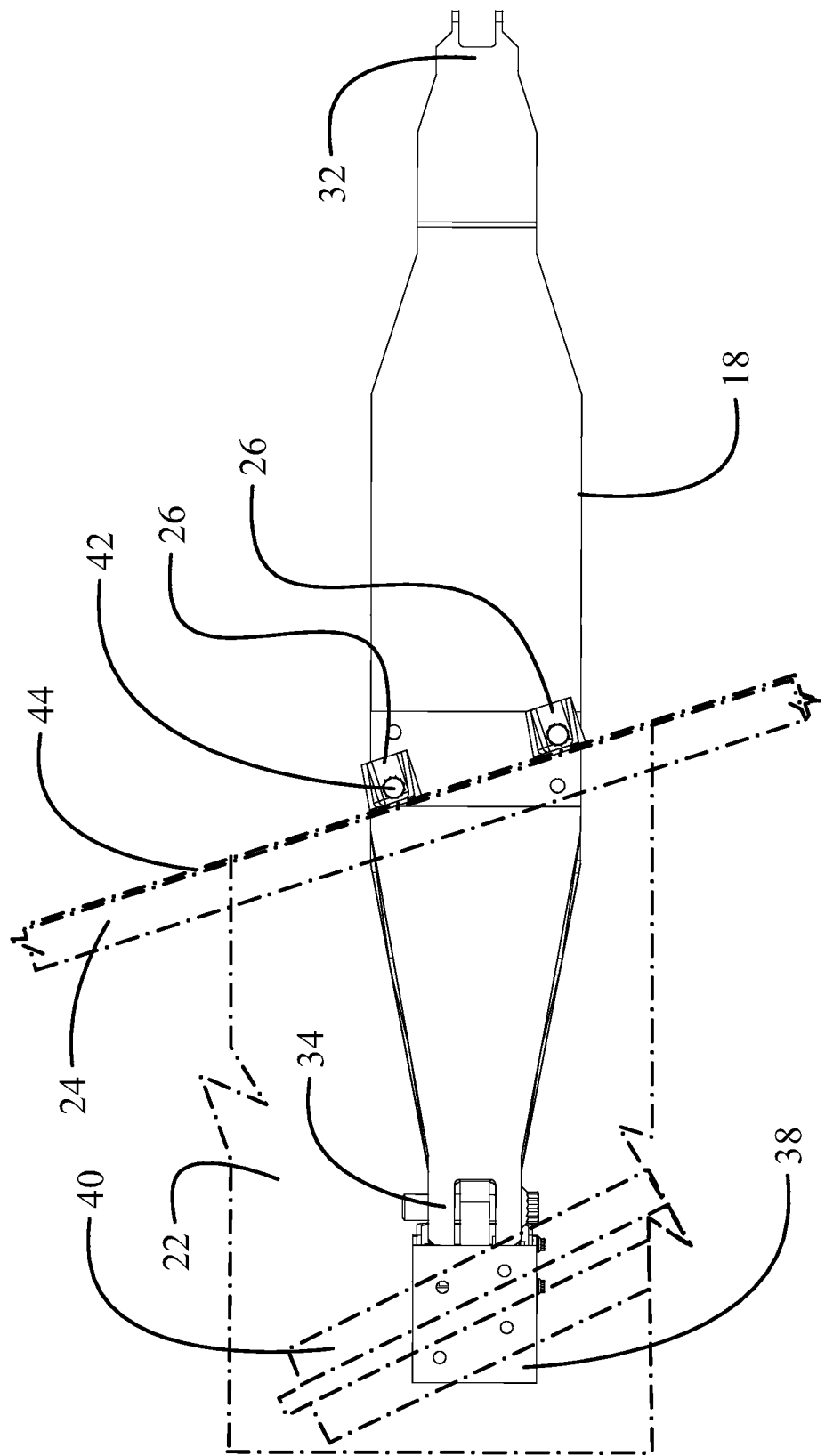
FIG. 3B is a detailed top view of the UWB and associated structure.
Figure 4A:
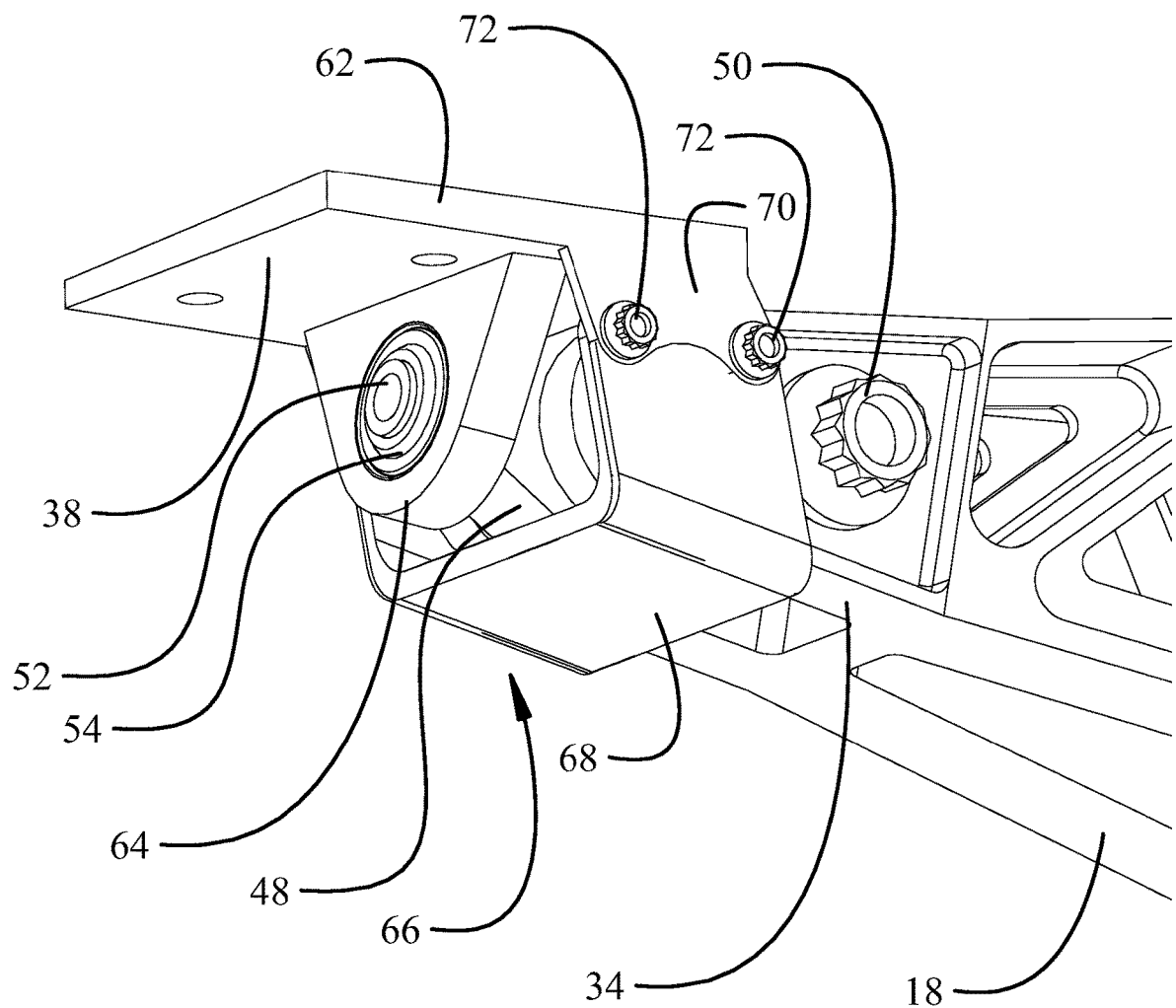
FIG. 4A is further detailed pictorial representation of the elements of the exemplary implementation for engagement of a forward end of the UWB to the wing structure.
Figure 4B:
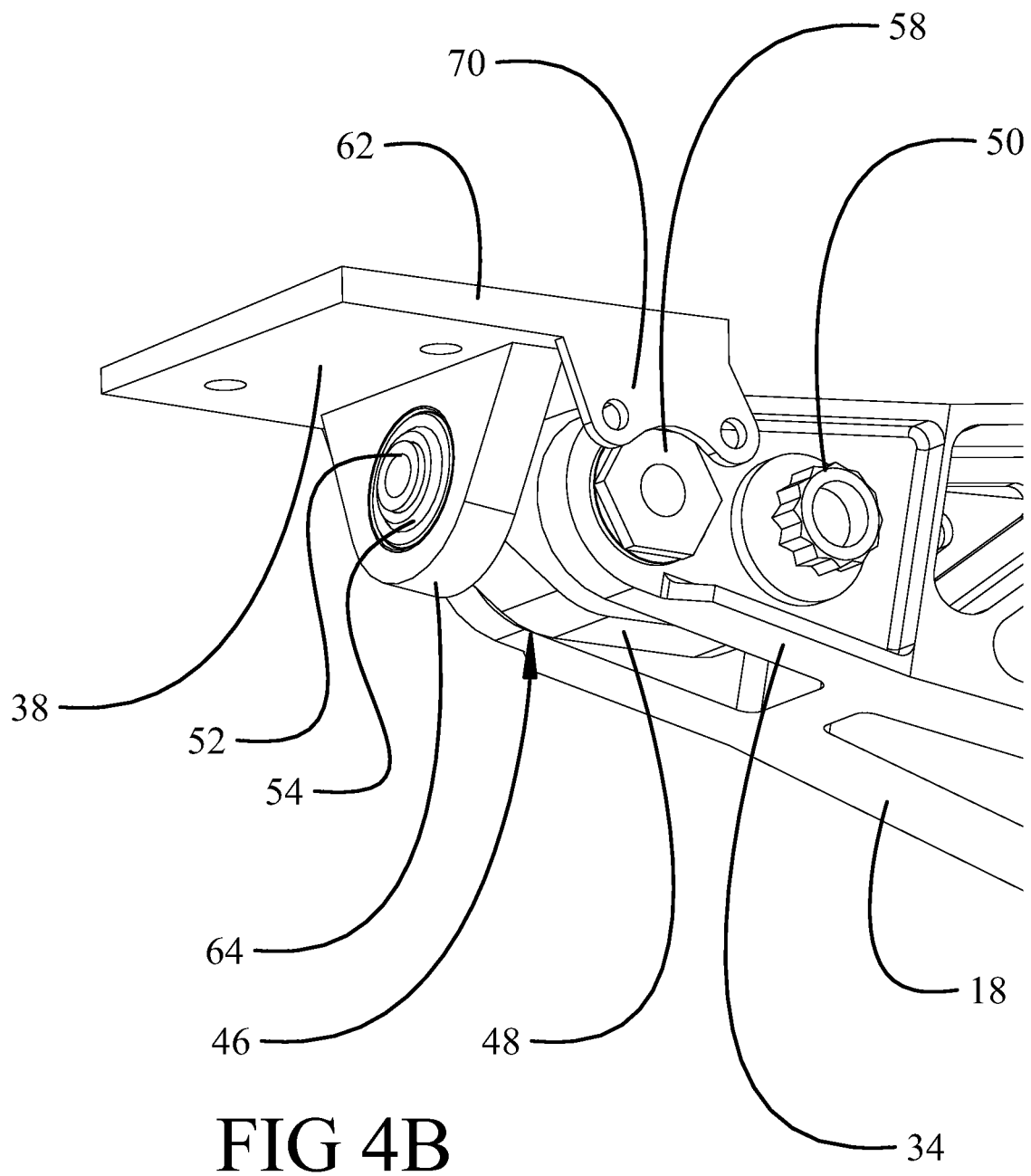
FIG. 4B is a the detailed pictorial representation of FIG. 4A with the catcher saddle removed for clarity.

A general layout of the overall structure is seen in FIGS. 3A and 3B with details shown in FIGS. 4A and 4B. The UWB 18 has a clevis 34 on a forward end 36 of the UWB. A spherical bearing support assembly 38 carrying a spherical bearing (to be described in greater detail subsequently) is mounted to fixed wing structure 40 proximate the lower wing skin 22 (shown in phantom). The attachment brackets 26 are connected to the UWB 18 with fasteners 42, and extend upward and are attached along a rear surface 44 of the rear spar 24 (shown in phantom).

As shown in greater detail in FIGS. 4A, 4B, 5A and 5B, a joint coupling 46 having a lug 48 is pivotally coupled to the clevis 34 with a pivot pin 50. A longitudinal pin 52 extending from the lug 48 is slidably received in a spherical bearing 54. The lug 48 has a bore 56 in which a fuse pin 58 is disposed to secure the lug 48 to the clevis 34. The fuse pin 58 inhibits the lug 48 from pivoting relative to the clevis 34. The lug 48 has a second bore 60 to receive the pivot pin 50 allowing relative rotational motion between the lug 48 and clevis 34.

Figure 5A:
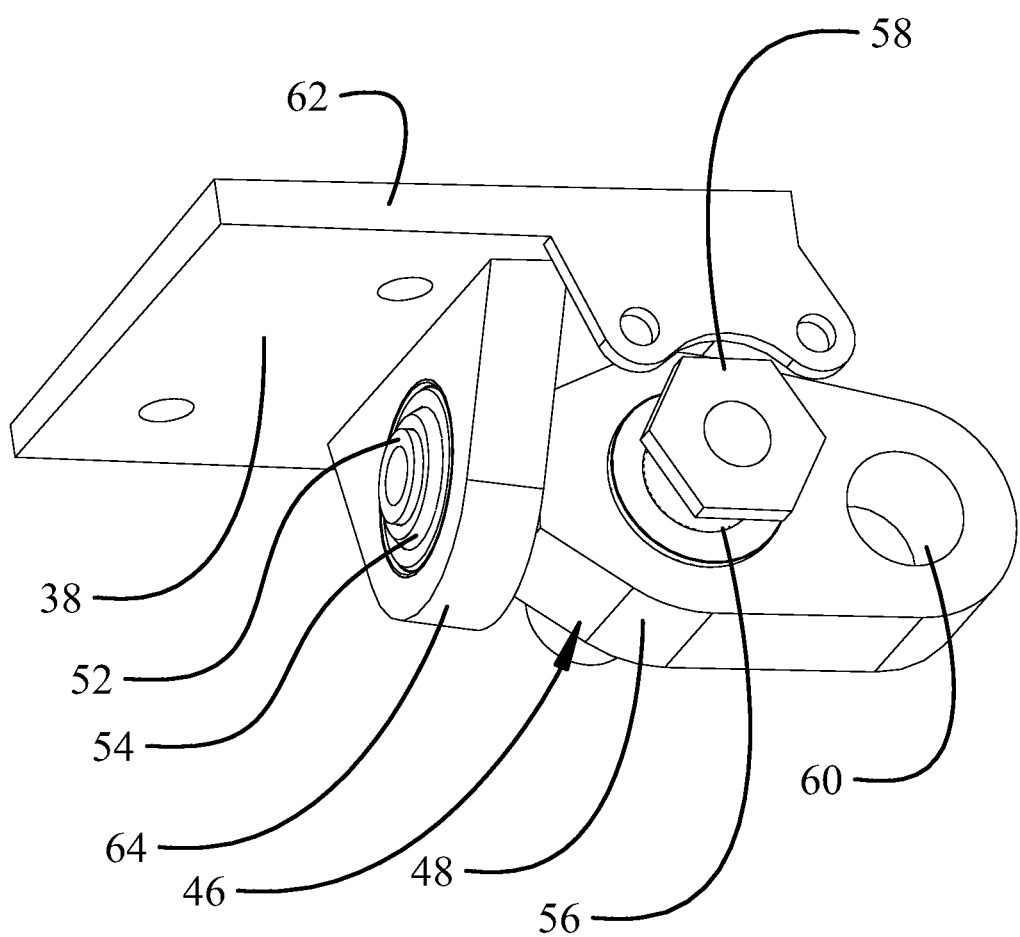
FIG. 5A is a detailed forward pictorial view of the fuseable pin and extractable pin support system.
Figure 5B:
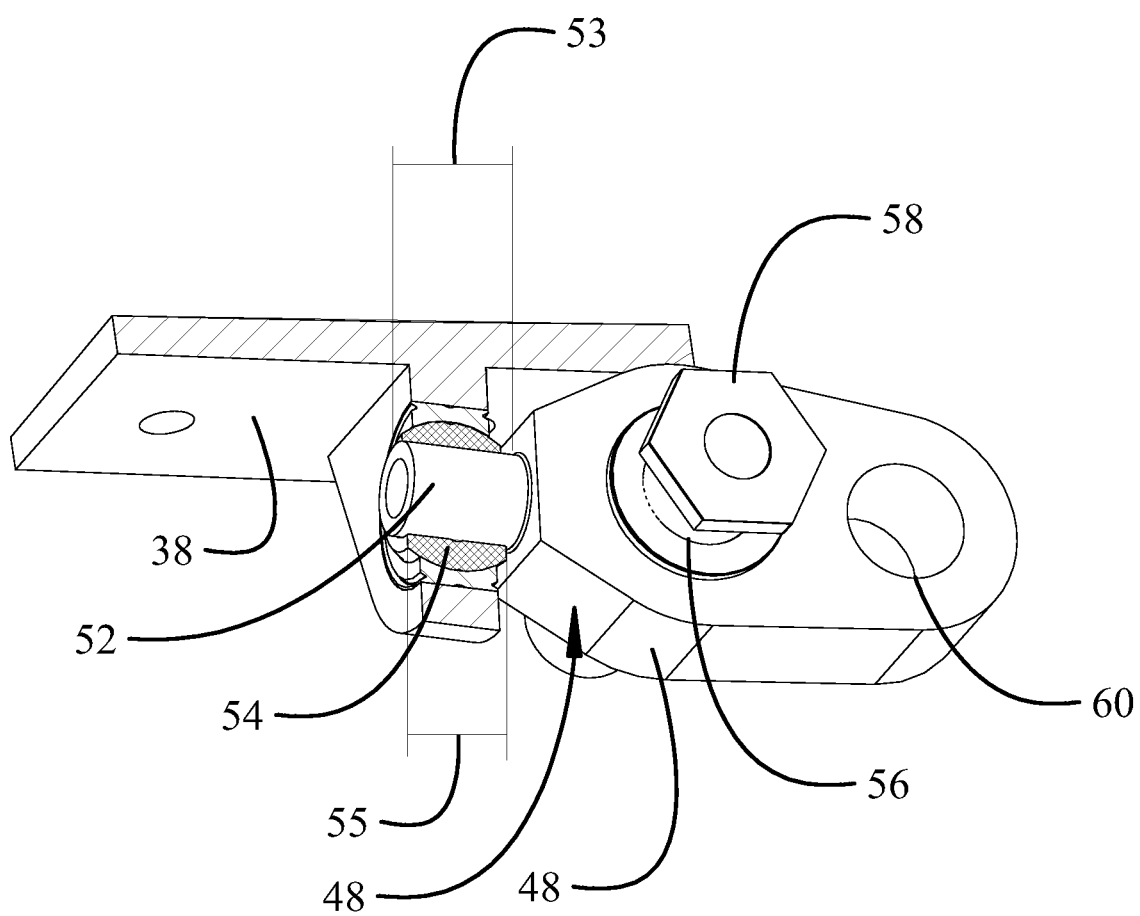
FIG. 5B is a side partial section view of the fuseable pin and extractable pin support system with the spherical bearing support assembly with support tang sectioned to display the pin and spherical bearing.

As best seen in FIGS. 5A and 5B, the spherical bearing support assembly 38 has an attachment plate 62, which is secured to the fixed wing structure 40. A tang 64, depending substantially vertically from the attachment plate 62, houses the spherical bearing 54. The longitudinal pin 52 has a length 53 greater than a depth 55 of the spherical bearing with an overhang sufficient to accept thermal shrinkage and providing a gap between the spherical bearing 54 and lug 48 for thermal expansion.

For the exemplary implementation, a catcher 66 extends from in the spherical bearing support assembly 38 as a failsafe device to engage the clevis 34. The catcher 66 has a saddle 68 suspended from mating flanges 70 depending from the attachment plate 62 as best seen in FIG. 4A. If a failure of the fuse pin 58 or pivot pin 50 should occur, the clevis 34 is engaged and constrained by the saddle 68 to support the UWB 18 to prevent rotation and separation, as will be described subsequently. The saddle 68 is constrained by secondary fusable bolts 72 engaging the mating flanges 70. For the exemplary implementation two secondary fusable bolts 72 are employed; one forward and one aft of the fuse pin 58.

Figure 6A:
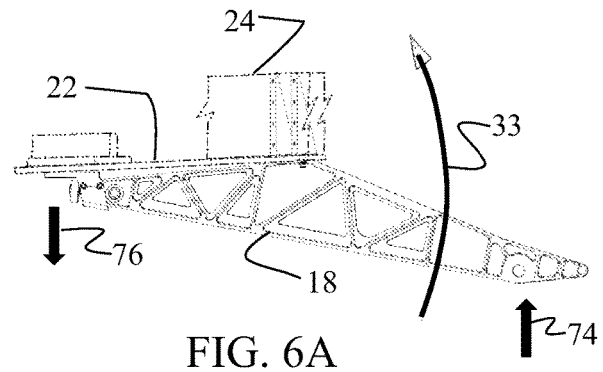
FIGS. 6A-6E are a sequence schematic of fusing and separation of the UWB employing the exemplary implementation.
Figure 6B:
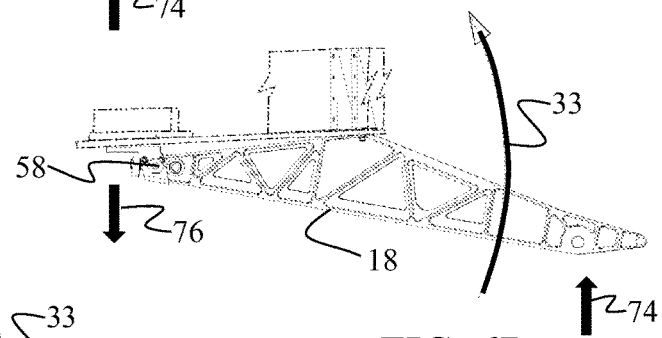
Figure 6C:
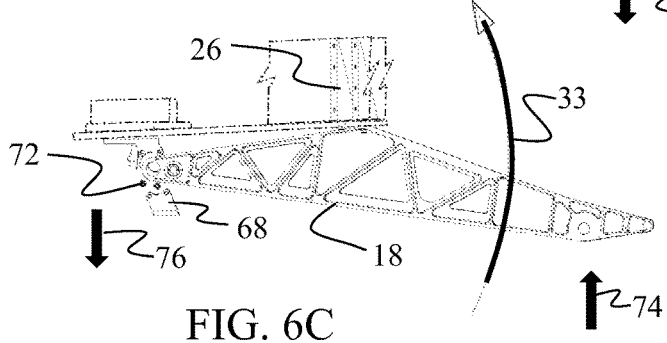
Figure 6D:
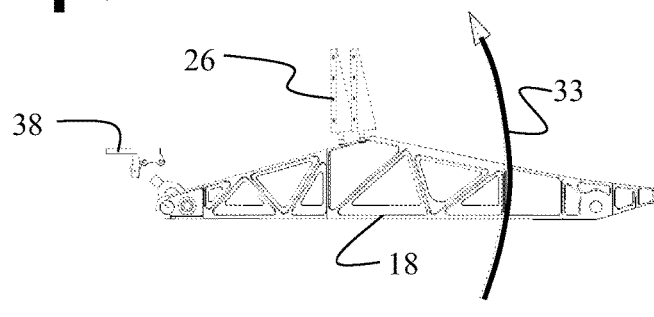
Figure 6E:
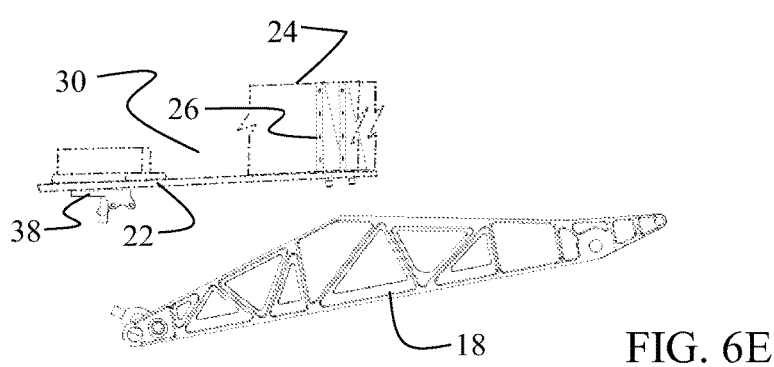
Figure 7A:
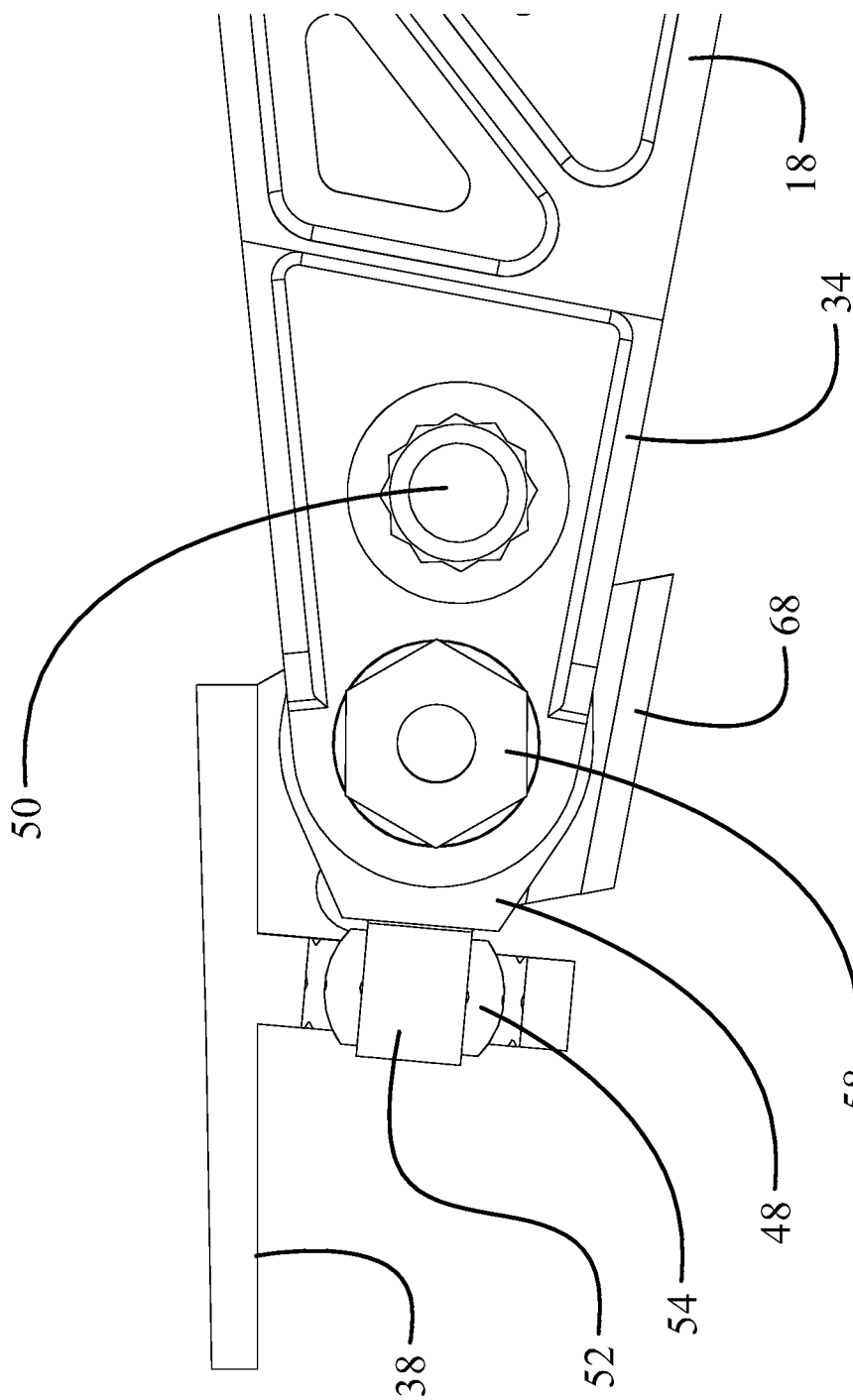
Figure 7B:
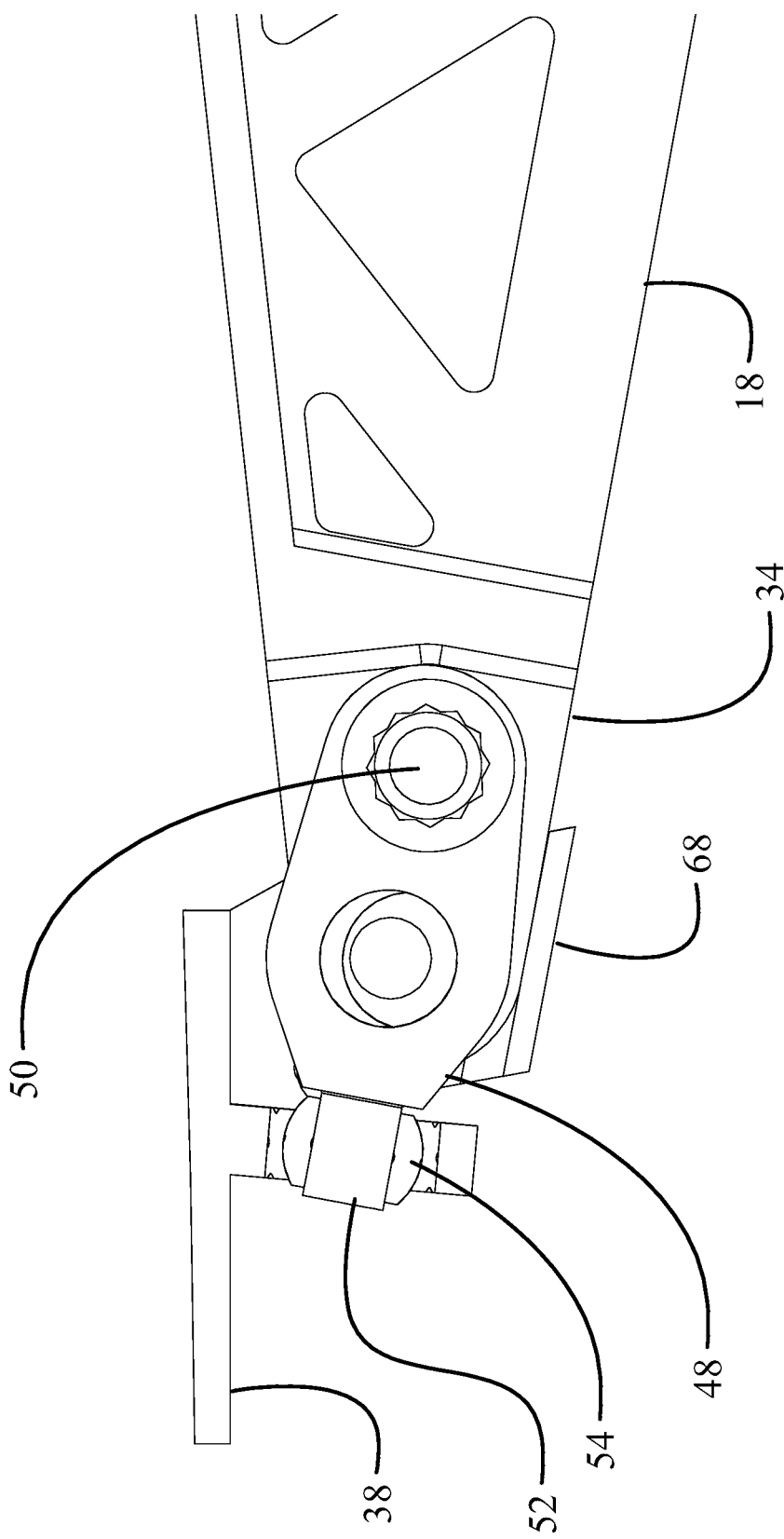
Figure 7D:
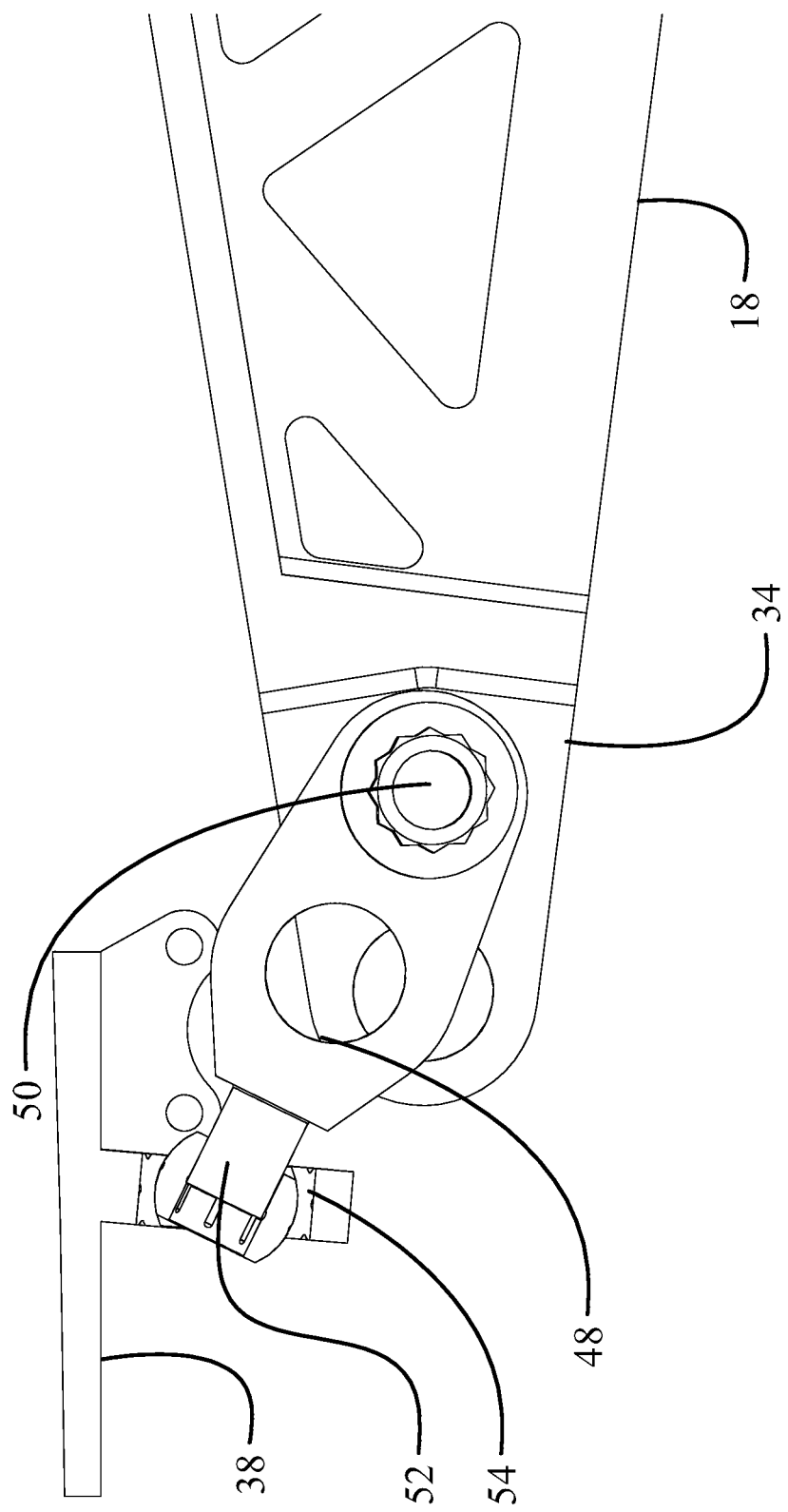
Figure 7E:
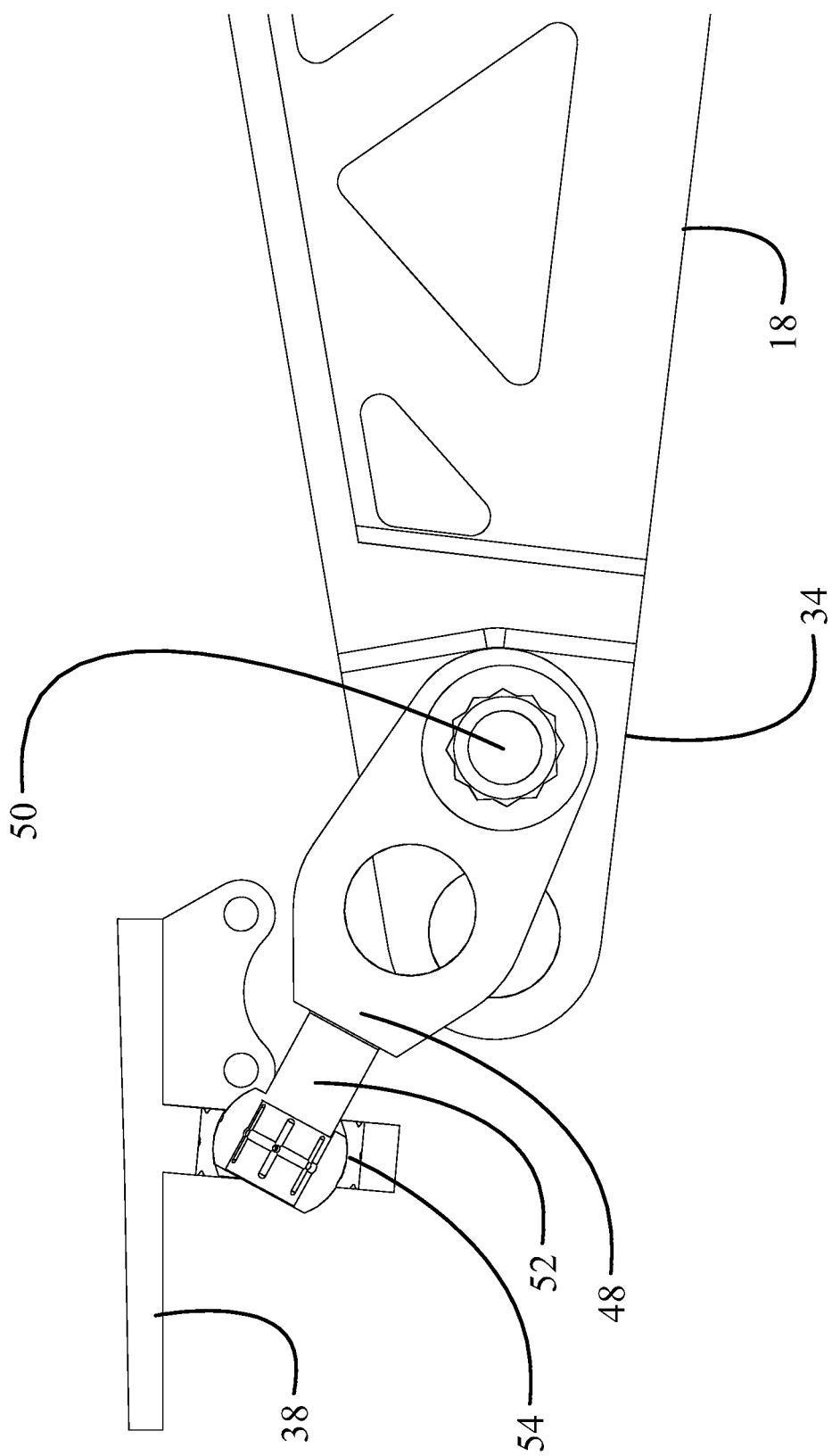
Figure 7F:
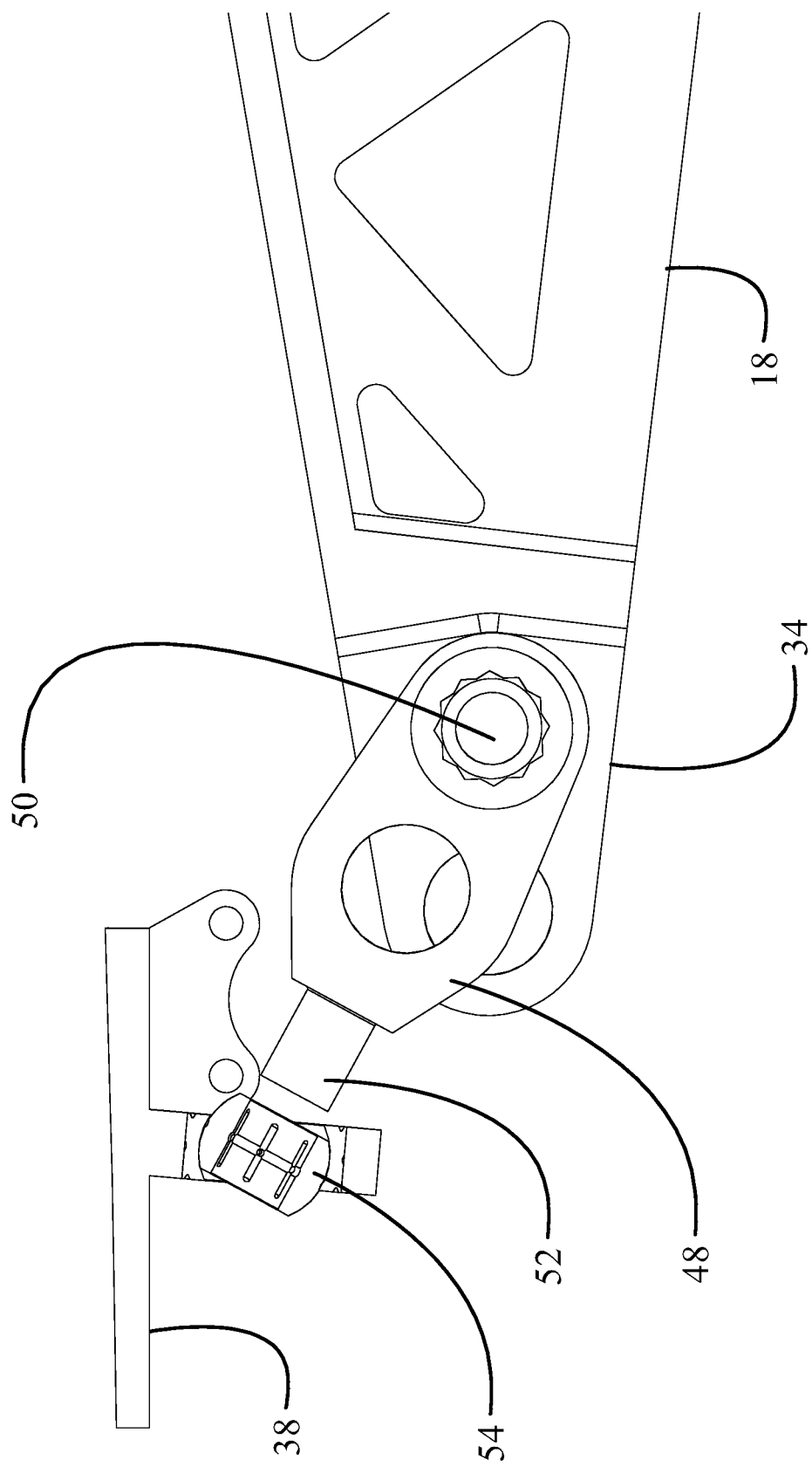
Figure 7G:
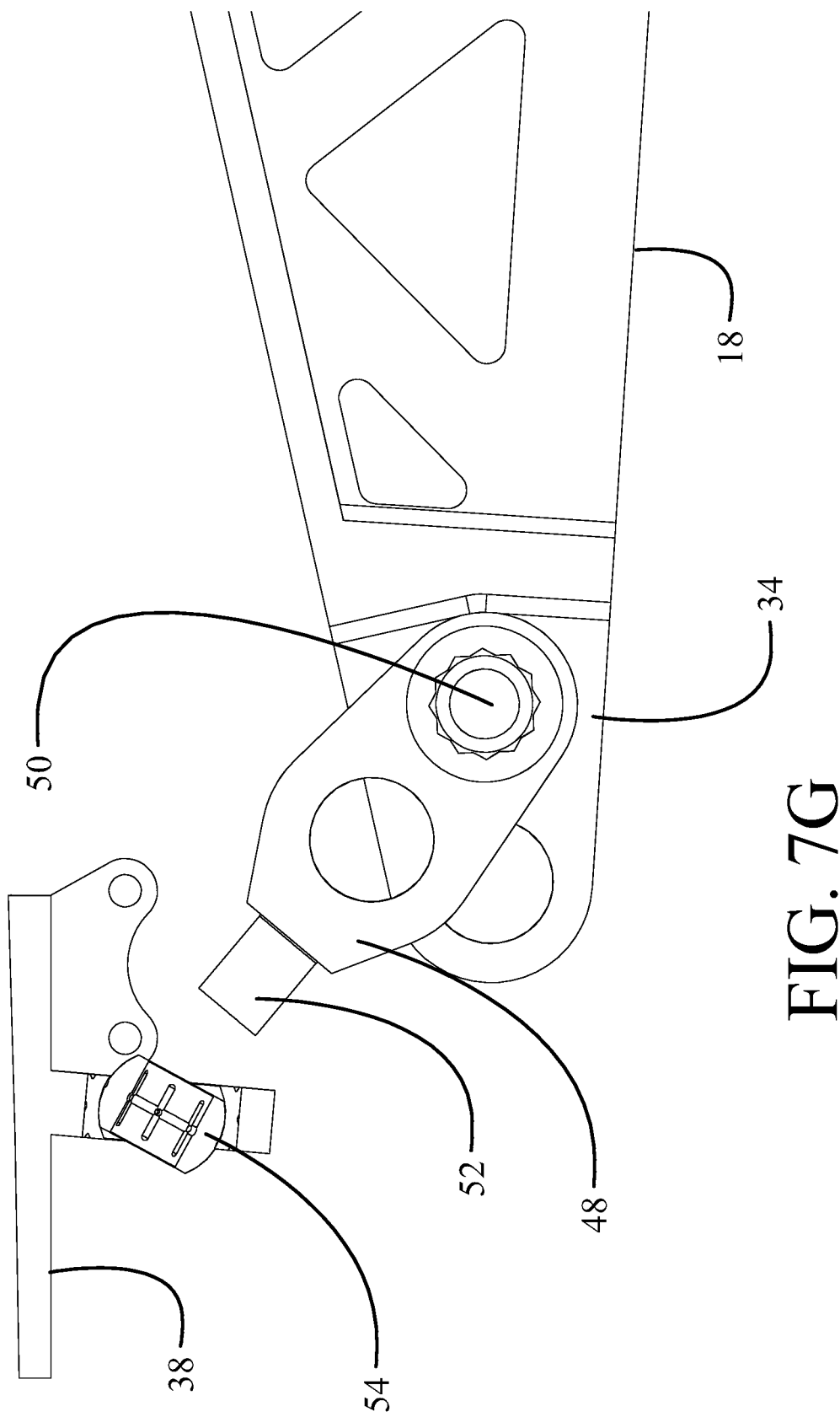
Figure 8:
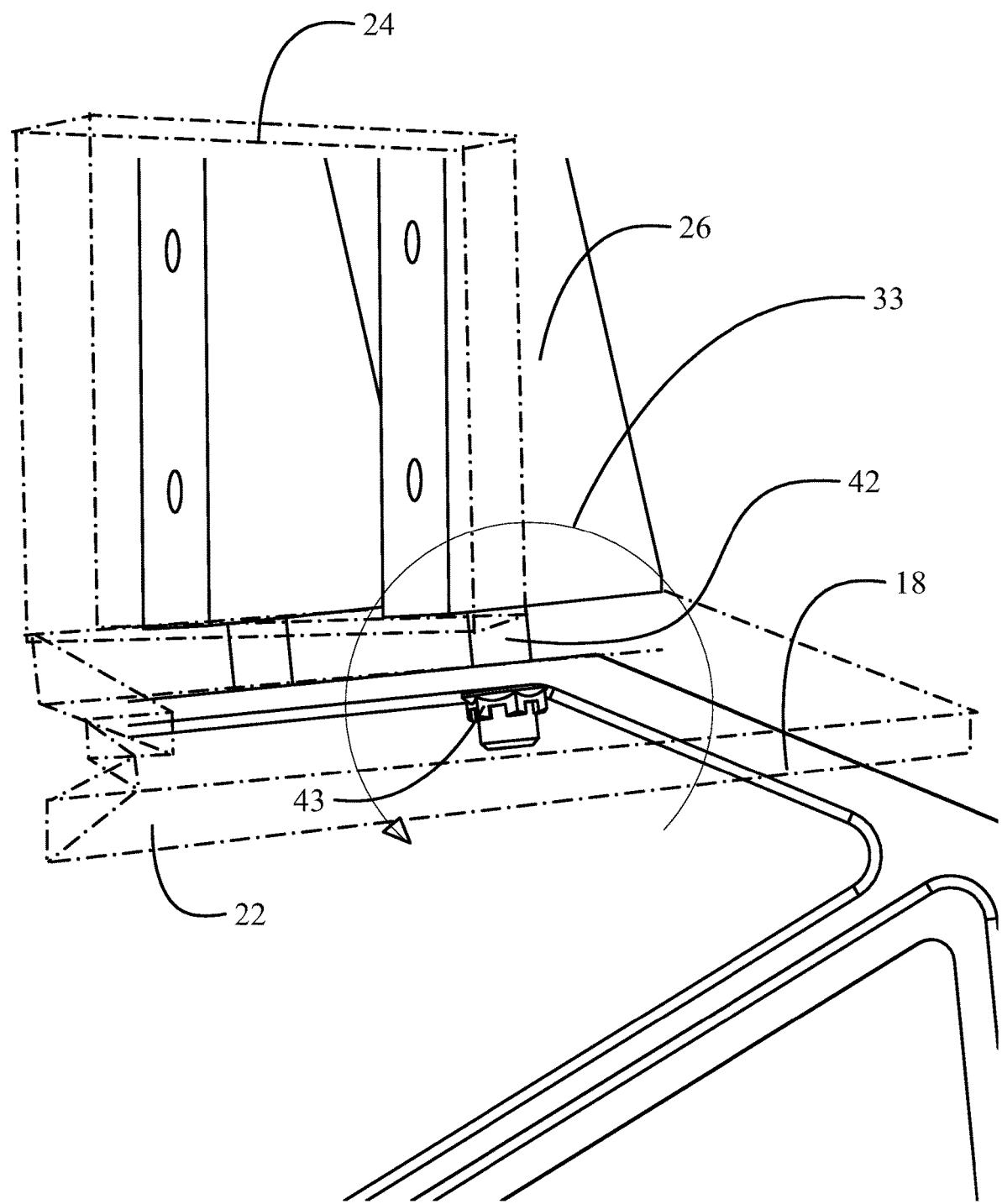
FIG. 8 is a detailed view of the attachment brackets to the aft spar with associated fasteners; and, FIGS. 9A and 9B are a flow chart of a method for storage and preparation of entrees employing the disclosed implementation.

As shown in the sequence of FIGS. 6A-6E, upon the occurrence of an impact event wherein a force 74 is applied to an aft portion of the UWB 18 that is sufficient to urge separation from the wing, FIG. 6A, force 74 imparts the moment 33 causing the clevis 34 to apply a shear force 76 to shear the fuse pin 58. The fuse pin is sheared, FIG. 6B, and enables the lug 48 to rotate about pivot pin 50 from its operational position seen in detail in FIG. 7A to a first position seen in FIG. 7B allowing the UWB 18 to rotate causing the clevis 34 to contact the saddle 68. If a failure of the fuse pin 58 has released the clevis for rotation as opposed to an operational impact on the UWB or flaps, the saddle 68 supports the clevis 34 in the position shown in FIG. 7B. The spherical bearing 54 rotates within in the tang 64 maintaining alignment with the longitudinal pin 52. However, if an impact to the flaps or UWB has occurred, the continuing moment and shear force 76 additionally induces shearing of the secondary fusable bolts 72, as seen in FIG. 6C and FIG. 7C, releasing the saddle 68 and allowing the UWB 18 to continue rotating. Lug 48, rotatably constrained within the clevis 34 by pivot pin 50 allowing relative rotation between the lug and clevis, urges withdrawal of longitudinal pin 52 within the spherical bearing 54 which also continues to rotate maintaining alignment with longitudinal pin 52, as seen in FIG. 7D. As seen in FIGS. 7E, 7F and 7G, continued rotation of the UWB 18 causes the longitudinal pin 52 to slide out of the spherical bearing 54 releasing the forward end 36 of the UWB 18 for continued rotation about the rear spar attachment brackets 26. As seen in FIG. 6D (wing skin and aft spar not shown for clarity), further rotation of the UWB 18 with a short coupling of the fasteners 42 causes prying on frangible heads 43 on the fasteners, seen in detail in FIG. 8, to fracture the frangible heads 43 disengaging the fasteners whereby the UWB 18 and entire underwing flap support structure separates from the wing, as seen in FIG. 6E. The attachment brackets 26 remain attached to the rear spar 24 and the spherical bearing support assembly 38 remains attached to the fixed wing structure 40 preventing damage to the underside of the wing structure, rear spar and the associated integral fuel cell 30. In one embodiment, the fuse pin 58 may have a diameter size or design configured to shear in response to a predetermined shear force resulting from a force imparted to the flap structure that is a predetermined mount above the ultimate yield load for the wing structure and underwing beam for particular aircraft type, such as a predetermined amount of 7 percent above the ultimate yield, for example. The sacrificial fuse pin 58 and sacrificial fusable bolts 72 that enable the longitudinal pin 52 to be slidably removed from the spherical bearing 54 in response to a force against the flap structure accordingly enable the underwing beam to separate from the wing without attachment assembly 38 to the wing structure 40 causing any damage to the underside of the wing structure.

Figure 9A:
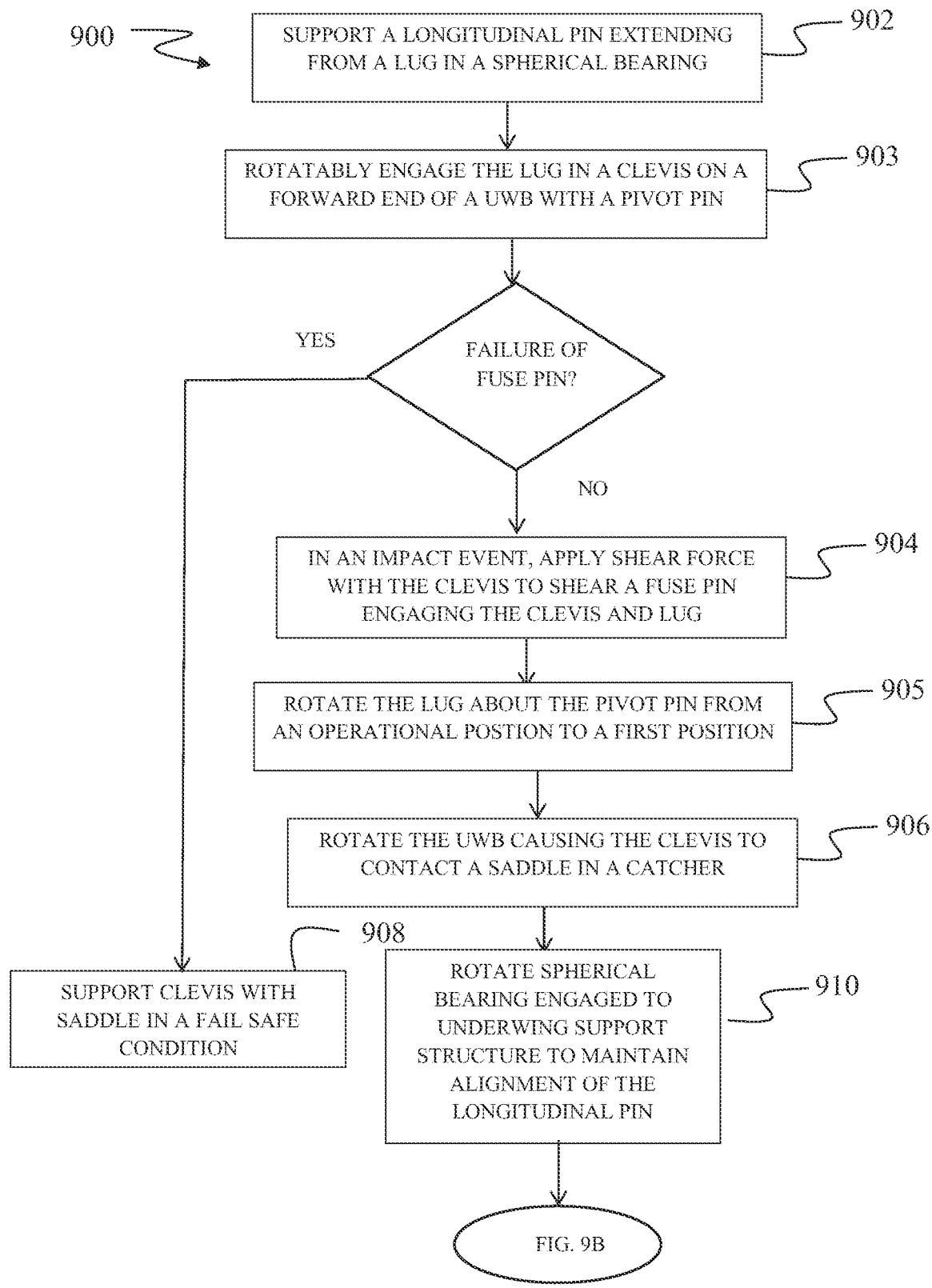
Figure 9B:
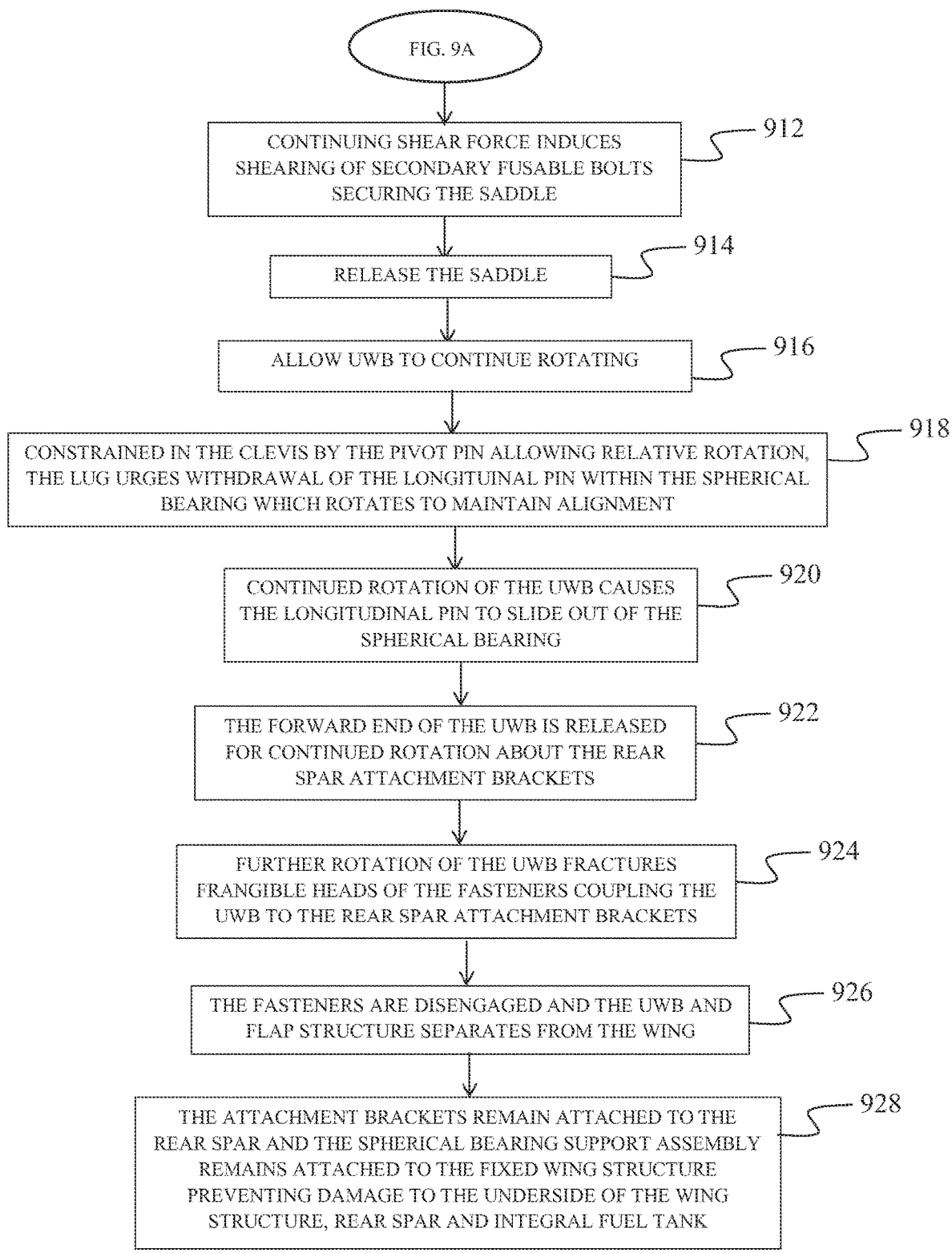

The implementation disclosed provides a method 900 for separating an underwing flap support structure upon impact as shown in FIGS. 9A and 9B. A longitudinal pin 52 extending from a lug 48 is supported in a spherical bearing, step 902. The lug 48 is rotatably engaged in a clevis 34 on a forward end of a UWB 18 with a pivot pin 50, step 903. Upon the occurrence of an impact event wherein a force 74 is applied to an aft portion of a UWB 18 that is sufficient to urge separation from the wing, the clevis 34 applies a shear force 76 to shear a fuse pin 58 engaging the clevis and the lug, step 904. Contacting a ground surface with a flap 14 connected with support links 15 to the aft portion of the UWB may create the force. The lug 48 rotates about the pivot pin 50 from an operational position to a first position, step 905, and the UWB 18 rotates causing the clevis 34 to contact a saddle 68 in a catcher 66, step 906. If a failure of the fuse pin 58 has released the clevis for rotation as opposed to an operational impact on the UWB or flaps, the saddle 68 supports the clevis 34 in a failsafe position, step 908. A spherical bearing 54 rotates within in a tang 64 depending from a plate 62 engaged to an underwing support structure 40 maintaining alignment of the longitudinal pin 52 extending from the lug and received in the spherical bearing, step 910. However, if an impact to the flaps or UWB has occurred, the continuing moment and shear force 76 additionally induces shearing of secondary fusable bolts 72 securing the saddle 68 to mating flanges 70 depending from the plate, step 912. The saddle 68 is released, step 914, and allows the UWB 18 to continue rotating, step 916. Lug 48, rotatably constrained within the clevis 34 by pivot pin 50 allowing relative rotation between the lug and clevis, urges withdrawal of longitudinal pin 52 within the spherical bearing 54 which also continues to rotate maintaining alignment with longitudinal pin 52, step 918. Continued rotation of the UWB 18 causes the longitudinal pin 52 to slide out of the spherical bearing 54, step 920, releasing a forward end 36 of the UWB 18 for continued rotation about rear spar attachment brackets 26, step 922. Further rotation of the UWB 18 with a short coupling of the fasteners 42 causes prying on frangible heads 43 on the fasteners fracturing frangible heads 43, step 924, disengaging the fasteners and separating the UWB 18 and entire underwing flap support structure from the wing, step 926. Damage is prevented to the underside of the wing structure, rear spar and the associated integral fuel tank by the attachment brackets 26 remaining attached to the rear spar 24 and the spherical bearing support assembly 38 remaining attached to the fixed wing structure 40, step 928.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims.

What is claimed is:

1. An under-wing flap support mounting structure, comprising:
   a clevis on a forward end of an underwing beam;
   a spherical bearing support assembly carrying a spherical bearing and mounted to a fixed wing structure proximate a lower wing skin;
   a joint coupling having a lug pivotally coupled to the clevis and a longitudinal pin extending from the lug, the longitudinal pin slidably received in the spherical bearing, the lug having a bore in which a fuse pin is disposed to secure the lug to the clevis and inhibit the lug from pivoting relative to the clevis;
   wherein a force applied to an aft portion of the underwing beam that is sufficient to urge separation from the wing creates a moment inducing the clevis to apply a shear force to shear the fuse pin and enable the lug to pivot and cause the longitudinal pin to slide out of the spherical bearing, whereby the underwing beam separates from the wing without resulting damage to an underside of a wing structure.

2. The under-wing flap support mounting structure as defined in claim 1 wherein the lug has a second bore to receive a pivot pin allowing relative rotational motion between the lug and clevis.

3. The under-wing flap support mounting structure as defined in claim 1 further comprising attachment brackets attaching the underwing beam to a rear spar extending upward from the lower wing skin.

4. The under-wing flap support mounting structure as defined in claim 1 further comprising a catcher extending from in the spherical bearing support assembly as a failsafe device to engage the clevis.

5. The under-wing flap support mounting structure as defined in claim 4 wherein the spherical bearing support assembly has an attachment plate secured to the fixed wing structure and the catcher has a saddle suspended from mating flanges depending from the attachment plate.

6. The under-wing flap support mounting structure as defined in claim 5 further comprising secondary fusable bolts engaging the mating flanges to constrain the saddle.

7. The under-wing flap support mounting structure as defined in claim 6 wherein the moment further causes the clevis to continue to apply shear force inducing shearing of the secondary fusable bolts.

8. The under-wing flap support mounting structure as defined in claim 3 wherein the attachment brackets are attached to the underwing beam with fasteners having frangible heads.

9. The under-wing flap support mounting structure as defined in claim 8 wherein the force further causes the underwing beam to rotate fracturing the frangible heads thereby releasing the underwing beam from the attachment brackets.

10. The under-wing flap support mounting structure as defined in claim 1 wherein a flap is attached to the underwing beam with one or more support links, said support links engaged proximate the aft portion of the underwing beam in an extended position of the flap whereby ground contact of the flap applies the force to the aft portion.

11. A method for separating an underwing flap support structure upon impact, the method comprising:
    supporting a longitudinal pin extending from a lug in a spherical bearing;
    rotatably engaging the lug in a clevis on a forward end of an underwing beam (UWB) mounted in a wing;
    applying a force to an aft portion of the UWB that is sufficient to urge separation from the wing;
    applying a shear force with the clevis to shear a fuse pin engaging the clevis and the lug;
    rotating the lug;
    rotating the spherical bearing maintaining alignment of the longitudinal pin extending from the lug;
    sliding the longitudinal pin out of the spherical bearing; and,
    releasing a forward end of the UWB for continued rotation.

12. The method as defined in claim 11 further comprising:
    in response to a failure of the fuse pin, rotating the UWB from an operational position to a first position;
    contacting the clevis on a saddle in a catcher; and,
    supporting the clevis with the saddle in a failsafe position.

13. The method as defined in claim 11 further comprising:
    shearing secondary fusable bolts securing a saddle to mating flanges depending from a plate of a spherical bearing support assembly engaged to fixed wing structure;
    releasing the saddle; and,
    allowing the UWB to continue rotating.

14. The method as defined in claim 11 further comprising:
    rotatably constraining the lug within the clevis by a pivot pin;
    allowing relative rotation between the lug and clevis;
    urging withdrawal of longitudinal pin within the spherical bearing;
    rotating the spherical bearing; and
    maintaining alignment of the spherical bearing with the longitudinal pin.

15. The method as defined in claim 11 further comprising rotating the UWB about rear spar attachment brackets.

16. The method as defined in claim 15 further comprising:
    rotating the UWB with a short coupling of fasteners connecting the UWB to the attachment brackets;
    prying on frangible heads of the fasteners;
    fracturing the frangible heads;
    disengaging the fasteners; and
    separating the UWB and entire underwing flap support structure from the wing.

17. The method as defined in claim 16 further comprising preventing damage to an underside of a wing structure, rear spar and associated integral fuel cell by the attachment brackets remaining attached to the rear spar and the spherical bearing support assembly remaining attached to the fixed wing structure.

18. The method as defined in claim 11 wherein a flap is attached to the underwing beam with one or more support links and further comprising:

engaging the support links proximate the aft portion of the underwing beam in an extended position of the flap; and contacting the flap on a ground surface to apply the force to the aft portion.

\* \* \* \* \*